United States Patent [19]
Sweppy et al.

[11] Patent Number: 4,899,579
[45] Date of Patent: Feb. 13, 1990

[54] ONBOARD DIAGNOSTIC SYSTEM OF VEHICLE IGNITION SYSTEM

[75] Inventors: Michael S. Sweppy, Livonia; Richard R. Tuttle, Utica; Everett P. Schumaker, Mt. Clemens, all of Mich.

[73] Assignee: Ford Motor Company, Dearborn, Mich.

[21] Appl. No.: 252,620

[22] Filed: Oct. 3, 1988

[51] Int. Cl.[4] .......... G01M 19/00
[52] U.S. Cl. .......... 73/118.1
[58] Field of Search .......... 73/116, 118.1; 324/546, 324/547, 391, 392; 123/425, 435; 340/439

[56] References Cited

U.S. PATENT DOCUMENTS

| | | | |
|---|---|---|---|
| 3,857,086 | 12/1974 | Mooney et al. | 73/118.1 |
| 4,644,284 | 2/1987 | Friedline et al. | 73/116 |
| 4,711,227 | 12/1987 | Li et al. | 123/643 |
| 4,760,341 | 7/1988 | Skerritt | 73/116 |

OTHER PUBLICATIONS

"Ignition and Timing Systems", by K. L. Longstaff, Institution of Electrical Engineers Publication No. 181 (1979), entitled Automotive Electronics.

"A Distributorless Ignition System—Solid State Ignition High Voltage Distribution with Low RFI Emissions", by J. R. Asik, D. F. Moyer, and W. G. Rado, 1978, SAE Technical Paper 780327.

*Primary Examiner*—Robert R. Raevis
*Attorney, Agent, or Firm*—Peter Abolins; Keith L. Zerschling

[57] ABSTRACT

A method of operating an onboard diagnostic system for a distributorless ignition system of an internal combustion engine includes detecting the time of occurrence of a spark plug firing and calculating the time of spark plug firing. The calculated time and the detected time are compared to see if they come within a predetermined time period, adjusted for averaged rotational velocity. A fault is indicated if the time of occurrence of the calculated and the detected spark do not come within the predetermined time period.

10 Claims, 6 Drawing Sheets

ONBOARD DIAGNOSTIC SYSTEM OF VEHICLE IGNITION SYSTEM

BACKGROUND OF THE INVENTION

1. Field of the Invention

This invention relates to detecting faults in an ignition system for an internal combustion engine.

2. Prior Art

When operating an internal combustion engine having an ignition system for providing ignition current to spark plugs located in the cylinders of the internal combustion engine, it is known to sense missing sparks to provide an indication of a fault. Systems for detecting the timing of a spark are also known. These systems are usually offboard the vehicle in a service area and have been typically used in connection with distributor ignition systems.

Distributorless ignition systems (DIS) are advantageous in that they eliminate the distributor with its attendant mechanical wear and thus offer the potential for eliminating the failures due to such mechanical wear. Such systems are known and described in, for example, in "Ignition and Timing Systems", by K. L. Longstaff, Institution of Electrical Engineers Publication No. 181 (1979) entitled Automotive Electronics and in a Society of Automotive Engineers Technical Paper 780327 entitled "A Distributorless Ignition System--Solid State Ignition High Voltage Distribution with Low RFI Emissions" by J. R. Asik, D. F. Moyer, and W. G. Rado, 1978.

The first article referenced above is devoted to review of various types of ignition systems, including DIS. The description of a DIS design for four cylinder application typically includes two ignition coils, each having a single primary winding and a floating secondary winding. Each high voltage terminal is connected to a single spark plug and each ignition coil primary is alternately energized and quickly de-energized, producing opposite polarity ignition voltages at each coil terminal. As a result, pairs of spark plugs are alternately fired, with each firing pair occurring in a compression or exhaust stroke and thereby providing the proper ignition to the engine.

The second article is devoted to a specific type of DIS utilizing a single ignition coil having two primary windings, a floating secondary winding, and four high voltage diodes to steer the ignition voltages to the proper spark plugs. Each high voltage terminal is connected to two spark plugs through a pair of high voltage diodes arranged in opposite polarity. This alternate DIS is suitable for igniting a four cylinder engine. For both types of DIS described, two-state signals are required for each electronic module. Such signals can be generated by an electronic engine control system.

It would be desirable to have a simple, reliable system onboard the vehicle that can detect and store various spark failures for distributorless ignition systems. These are some of the advantages this invention provides.

SUMMARY OF THE INVENTION

In conjunction with an internal combustion engine which has an electronic engine control, this invention provides an apparatus and method of testing a distributorless ignition system for an ignition fault. The electronic engine control computer determines the time when a spark plug should fire. The method of fault detection includes comparing the actual time of spark plug firing with the computer calculated time of spark plug firing, and indicating a fault if the computer calculated time of spark plug firing and the actual time of spark plug firing do not come within a predetermined time tolerance.

DETAILED DESCRIPTION OF THE INVENTION

Figure 1:
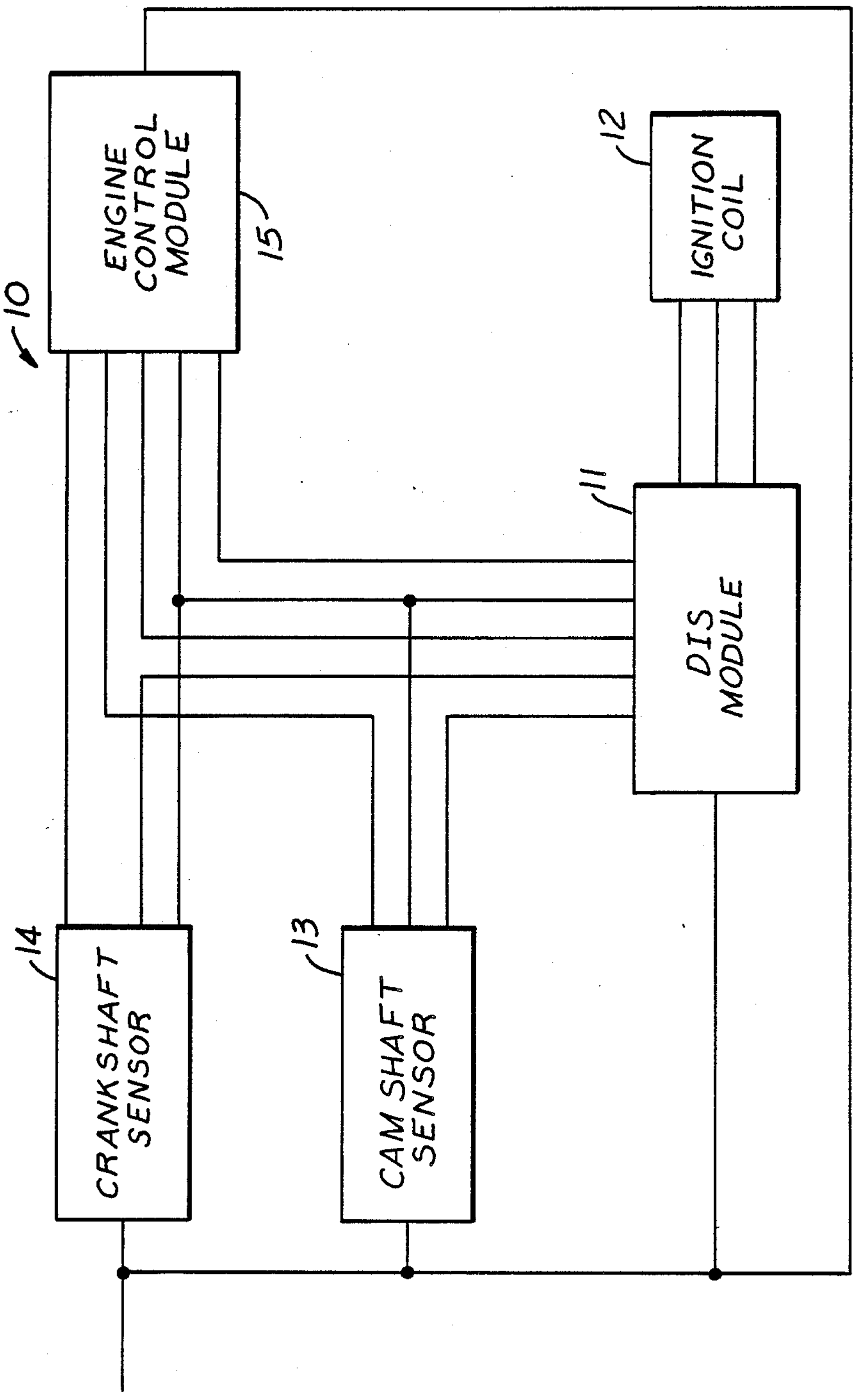
FIG. 1 is a schematic diagram of a distributorless ignition system in accordance with an embodiment of this invention.

Referring to FIG. 1, a distributorless ignition system (DIS) 10 includes an electronic distributorless ignition control module 11 coupled to an ignition coil 12. A camshaft sensor 13 is coupled to electronic distributorless ignition control module 11. A crankshaft sensor 14 is also coupled to electronic distributorless ignition control module 11. Crankshaft sensor 14, camshaft sensor 13 and electronic distributorless ignition control module 11 have outputs coupled to an electronic engine control module 15.

Figure 2:
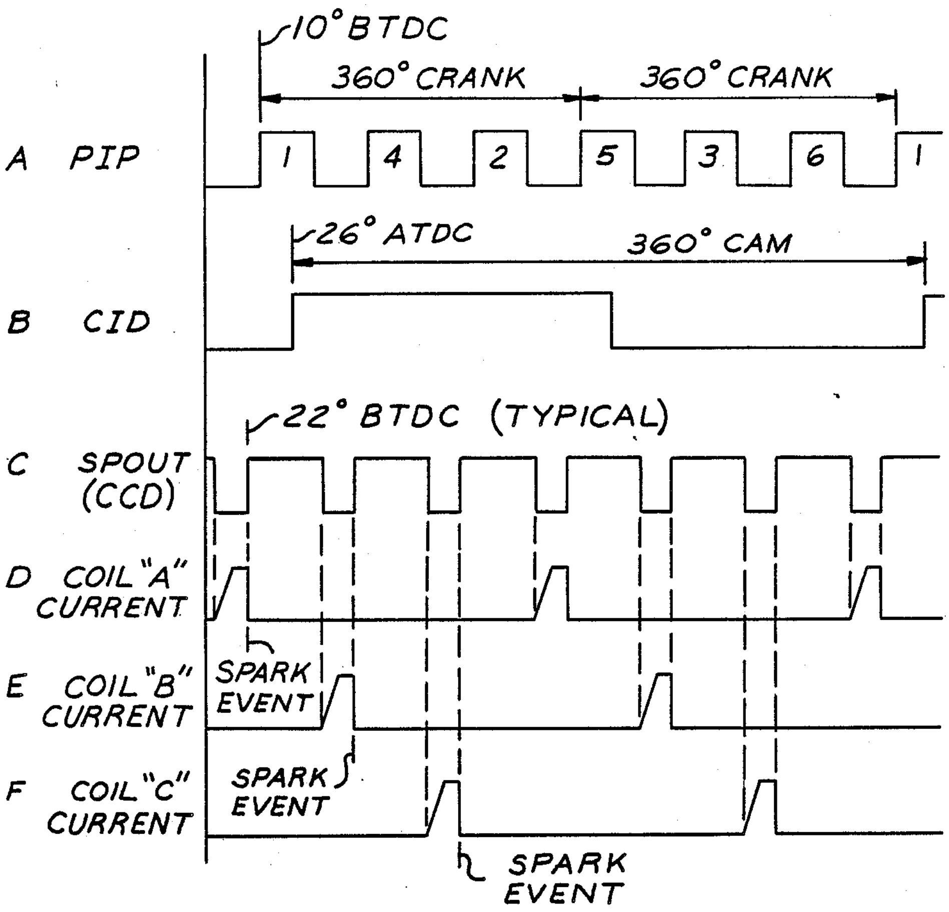
FIG. 2 is a graphical representation with respect to time of waveforms produced at certain points of the schematic drawing of FIG. 1.

Referring to FIG. 2, a waveform on line A gives the profile ignition pulse (PIP) indicating engine rotational position and can be generated by crankshaft sensor 14. The waveform on line A has a 50% duty cycle with the rising edges occurring at 10° BTDC (before top dead center) crankshaft position for each cylinder. The waveform of line B, a 50% duty cycle signal generated by a camshaft sensor, also indicates rotational position with the rising edge occurring at 26° after top dead center (ATDC) for cylinder number 1. The waveform of line C provides a spark out command (SPOUT) and has a variable duty cycle with the falling edge initiating coil charging and the rising edge commanding spark plug firing. The waveforms of lines D, E and F show the currents of coils A, B and C, respectively. The cylinder firing order of the engine is 1,4,2,5,3,6. Coil A services cylinders 1 and 5, coil B services cylinders 3 and 4, and coil C services cylinders 2 and 6 in this example.

A buffered tachometer signal is a digital square wave signal generated by the ignition module. The rising edge of the buffered tachometer signal occurs at the time of the spark plug firing. The falling edge is controlled by the SPOUT falling edge. When the buffered tachometer is applied to the engine control computer it is referred to as the ignition diagnostic monitor (IDM).

Figure 3:
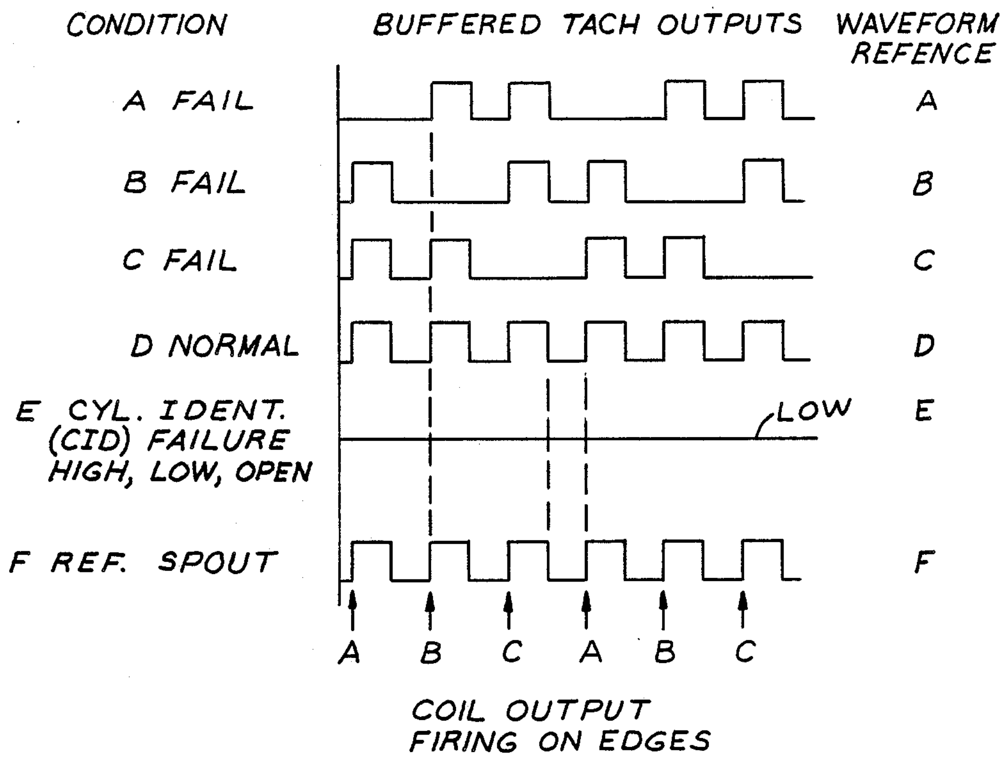
FIG. 3 is a graphical representation of buffered tachometer outputs versus time in accordance with an embodiment of this invention.

Referring to FIG. 3, various buffered tachometer outputs are shown. Under normal operating conditions, the buffered tachometer waveform is essentially the same as the SPOUT waveform as shown in line F of FIG. 3. Whenever a coil (A, B or C) does not produce an ignition spark firing, the corresponding output pulse is absent from the buffered tachometer waveform. This is indicated in waveforms on line A (A coil pulse missing), B (B coil pulse missing) and line C (C coil pulse missing) of FIG. 3. A cylinder identification (CID) failure results in the buffered tachometer signal, line E of FIG. 3, being held in a logical low state.

The buffered tachometer signal is applied to the engine control module where the time of the rising edge is measured in order to perform the ignition diagnostics.

Figure 4A:
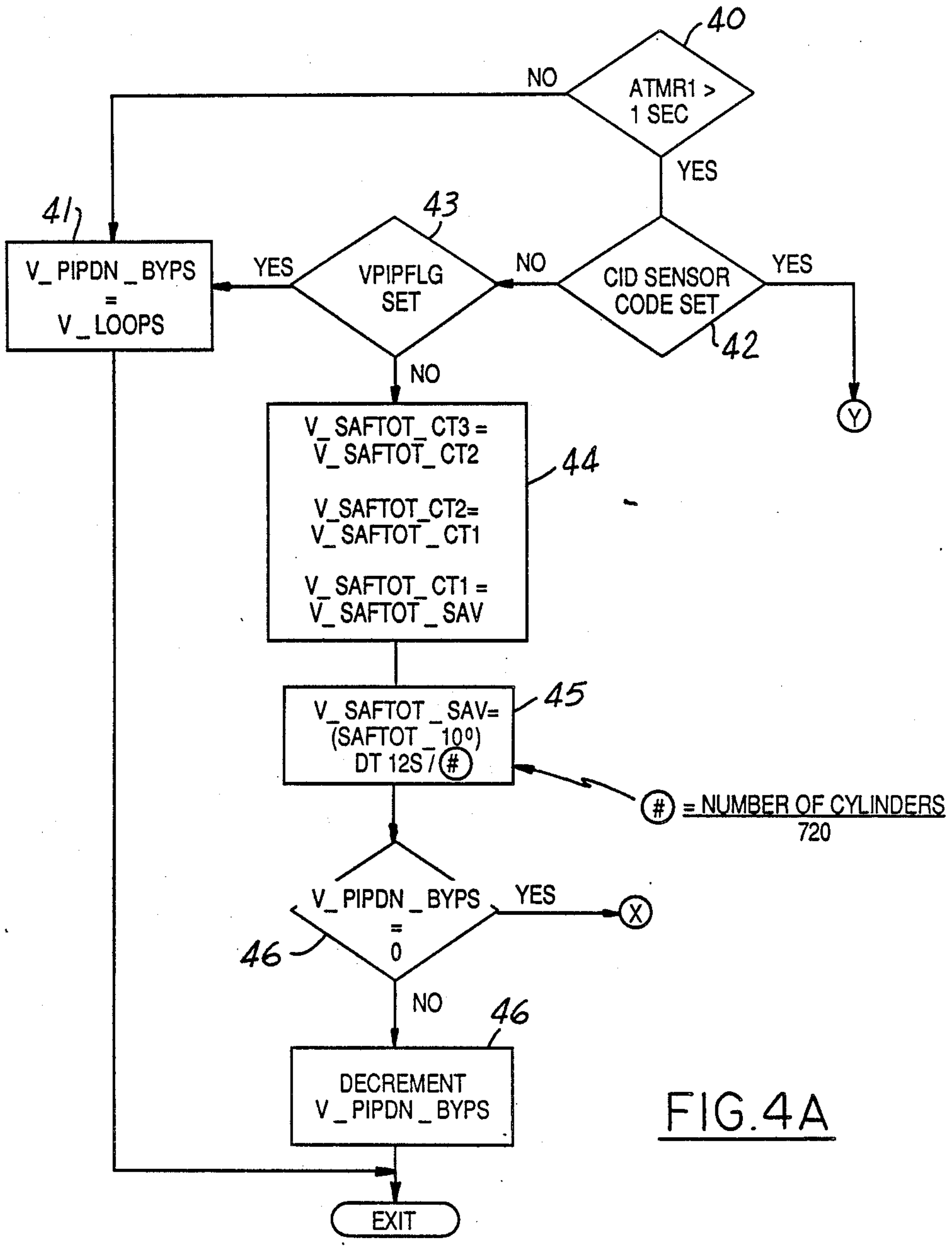
FIGS. 4A, 4B, 4C and 4D are a logic flow diagram of the logic flow of the ignition diagnostic system in accordance with an embodiment of this invention, wherein the logic of FIG. 4C determines which coil is malfunctioning, the logic of FIG. 4D determines which pair of coils is malfunctioning.

Referring to FIG. 4A, the logic flow for a diagnostic system for distributorless ignition system 10 is given. The following is a logical description of action occurring at the numbered points in the logic flow. Definitions of the abbreviations used are found in the Appendix.

Block 40 indicates test logic is bypassed until time since exiting crank mode (i.e., engine starting) exceeds 1 second. This prevents cranking transients from producing erroneous test results. The bypass register V_PIPDN_BYPS (number of times remaining to by-pass) at block 41 is held at V_LOOPS (number of times to bypass DIS system failure criteria logic) until ATMRl (time since start of electronic engine controller) exceeds 1 second.

Once time since cranking exceeds 1 second, logic flow goes to block 42 which indicates if a CID (cylinder identification) sensor failure has been detected. The ignition diagnostic tests are bypassed if a CID sensor error code is set and stored.

If no cylinder sensor failure is detected, logic flow goes to block 43 which indicates if VPIPFLG (SP_DIS, 1+ error found in FG PIP test) is set. This indicates a PIP (profile ignition pulse or crankshaft) sensor failure has occurred and there is insufficient data for determining DIS system operation. V_PIPDN_BYPS is set to V_LOOPS so correct data can be restored for proper DIS system testing. That is, the system test does not start until there have been a predetermined number of passes (V LOOPS) through the computer program and a predetermined amount of data has been stored in registers.

When PIP and CID sensor inputs indicate no sensor failure, logic flow goes to blocks 44 and 45 where equations convert SAFTOT (total spark advance - degrees of crankshaft rotation referenced from cylinder top dead center) from degrees to the commanded time between the spark event (IDM up) and the PIP up edge, and storage registers maintain a history of this time for the current and previous PIP events. That is, at block 44 current values of spark timing are saved for the next calculation pass. At block 45, the time of occurrence of the next spark event is calculated.

Block 46 indicates that if V_PIPDN_BYPS=0 then DIS system test processing can be performed. If there have not been sufficient passes through the computer program, the test cannot start and V_PIPDN_BYPS is decremented at block 46A before exiting.

Figure 4B:
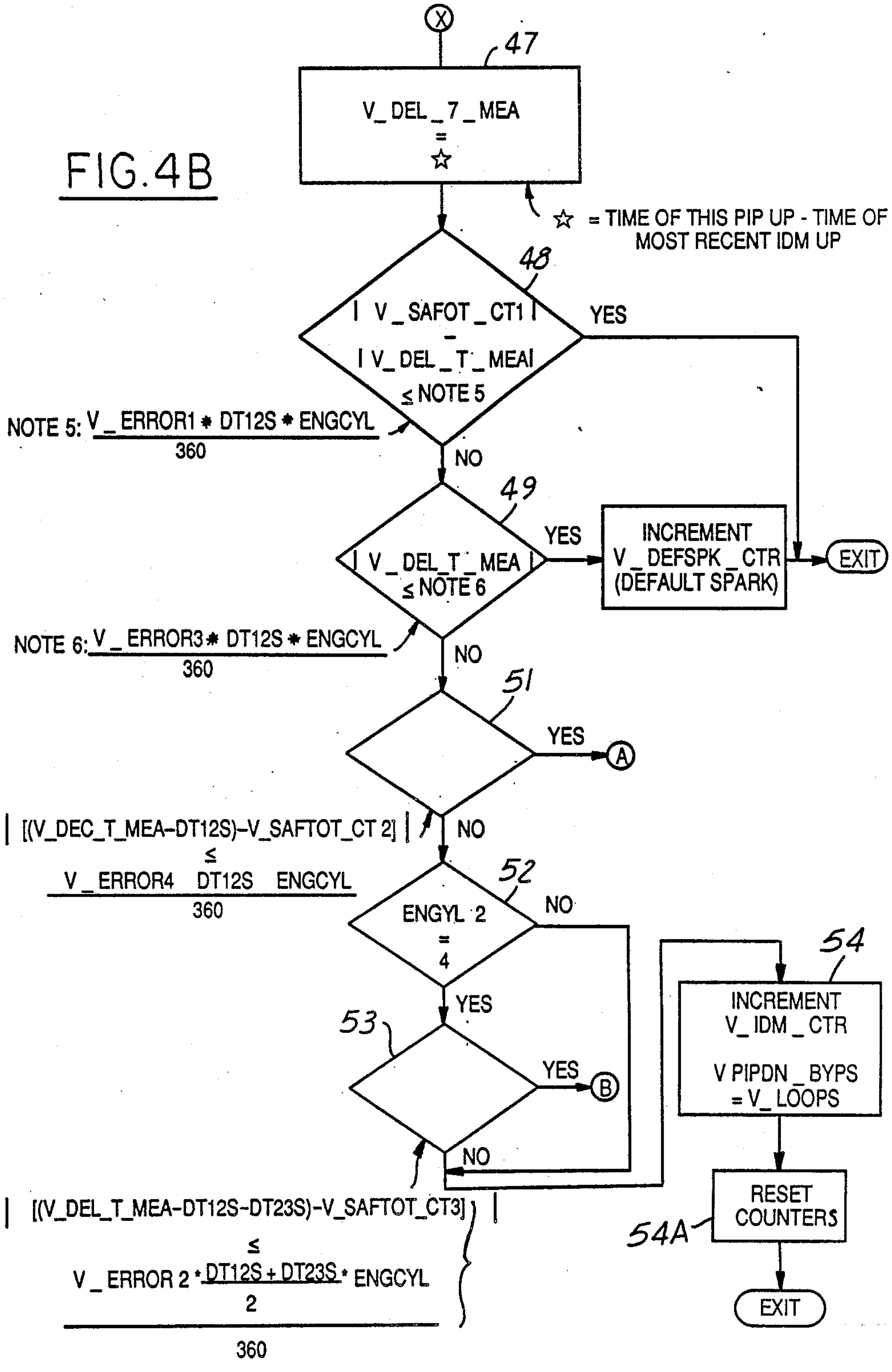

Referring to FIG. 4B, block 47 sets V_DEL_T_MEA (clock ticks between last high PIP and IDM) equal to the difference (in clock ticks) of the time of the rising edge of PIP and the time of the previous spark event (which is rising edge of buffered tachometer). This is the actual event time duration (or actual spark advance), which is compared at block 48 to a calculated time duration (or calculated spark advance).

In particular, block 48 compares the difference between measured (V_DEL_T_MEA) and calculated (V_SAFTOT_CT1 (last calculated spark advance - clock ticks)) time durations (or spark advances) to an error tolerance band. If the comparison falls outside of this error tolerance band further testing is performed by exiting at NO. Otherwise, the test is exited at YES.

Throughout this test procedure, comparisons for a valid spark, default spark, one or two missing spark events utilize a time duration tolerance to pass or fail. The time duration tolerance is a conversion to crankshaft degrees from time dependent engine RPM.

If block 48 indicates that a spark did not occur at the predicted or calculated time, the logic flows to block 49 where a check is made for engine operation at default spark, which is a condition when the time between the edges of the waveforms PIP and IDM is approximately zero. That is, there is a minimal spark advance. V_DEFSPK_CTR (number of default spark occurrences) is incremented at block 50 to indicate the occurrence of a non-requested default spark event and the test is exited. Otherwise further testing is performed.

Figure 4C:
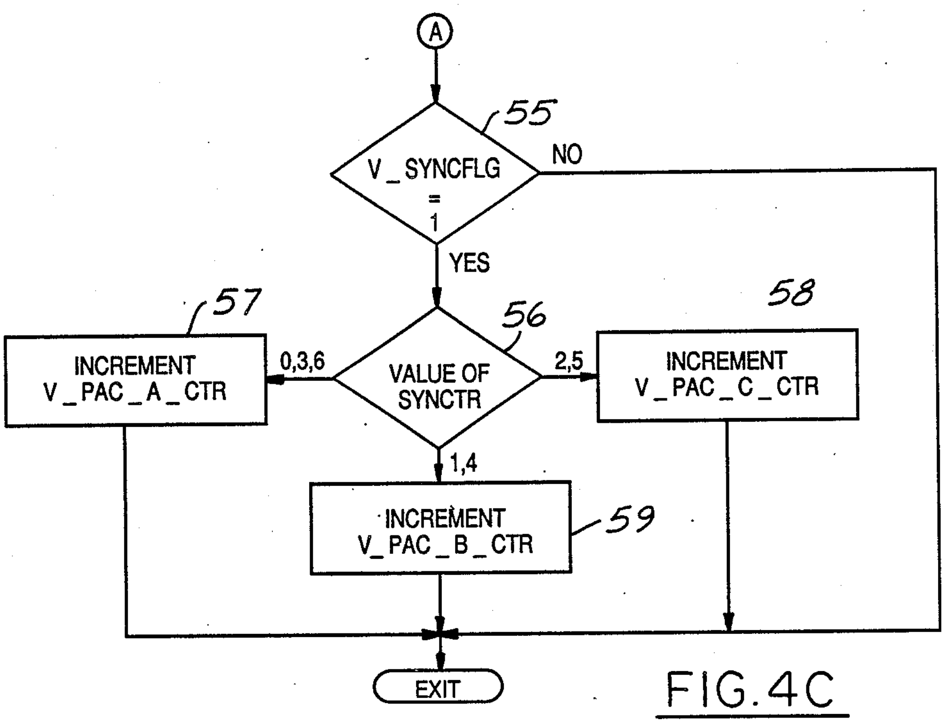

If at block 49 a non-default spark event is determined, the logic flows to block 51 which checks to see if the most recent IDM is from the previous PIP period. That is, the current expected IDM event failed to occur. If the comparison at block 51 is true, processing proceeds to block 55 (FIG. 4C) to determine which coil is associated with the missing spark event. Otherwise testing continues.

Block 52 evaluates the number of cylinders in the engine being tested. When the number of cylinders is determined, the process proceeds to block 53 for additional missing IDM testing.

Figure 4D:
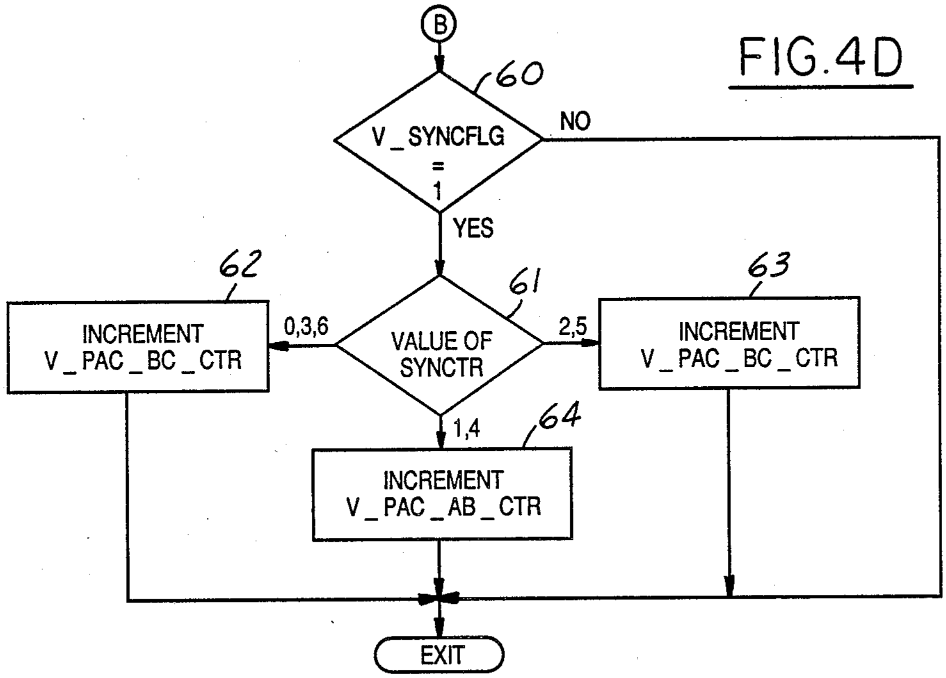

Block 53 indicates the comparison is similar to block 51 above except it checks to see if two IDM events in a row are missing. If this comparison is true, then logic flows to block 60 (FIG. 4D) to determine which two coils are associated with the missing two spark events.

If the comparison at block 53 is not satisfied, logic flows to block 54. That is, processing proceeds to this point if the IDM event did not occur at any expected location with respect to the current PIP up edge. V_IDM_CTR (number of undetermined IDM fault events) is incremented at block 54 to indicate the number of undetermined IDM fault errors. V_PIPDN_BYPS is set to V_LOOPS to allow blocks 44 and 45 to be cleared and refilled with new data. Logic flow continues from block 54 to block 54A to clear and set to zero counters V_PAC_A_CTR (no. of coil pack 'A' fault occurrences), V_PAC_B_CTR (no. of coil pack 'B' fault occurrences), V_PAC_C_CTR (no. of coil pack 'C' fault occurrences), V_PAC_AB_CTR (no. of combined coil pack 'A & B' faults), V_PAC_AC_CTR (no. of combined coil pack 'A & C' faults), and V_PAC_BC_CTR (no. of combined coil pack 'B & C' faults). This path is taken as a precaution to clear unrelated or noise failures which appear to be coil pack failure events.

Blocks 55-59 are reached from block 51 if the current expected IDM event failed to occur and provide a procedure to determine which coil is associated with the missing IDM. If the ignition system is in synchronized operation with the engine so the engine control computer knows which cylinder is next to be fired, (V_SYNCFLG=1, where 1 indicates engine in synchronization) then the value of SYNCTR (synchronization counter for PIP) is used to determine which cylinder was to be ignited.

Blocks 60-64 indicate the same logic sequence as blocks 55-59 but in a situation when two IDMs in a row were missed. The value of SYNCTR is used to determine the pair of cylinders that lost IDM.

Various modifications and variations will no doubt occur to those skilled in the arts to which this invention pertains. For example, the number of cylinders and the sequence of some of the steps may be varied from that disclosed herein. These and all other modifications which basically rely in the teachings through which is disclosure has advanced the art are properly considered within the scope of this invention.

calculating the time period between the occurrence of a spark plug firing and the occurrence of a reference signal; and determining the difference between the calculated time period and the detected time period to see if the difference comes within a predetermined time duration and indicating a fault if the time period of occurrence of the calculated and the detected spark period do not come within the predetermined time duration.

APPENDIX

ONBOARD IGNITION SYSTEM DIAGNOSTIC - Logic Flow
Definitions which represent registers and counters in a diagnostic system computer and/or computer program parameters.

| | |
|---|---|
| ATMR1 | TIME SINCE START (of Electronic Engine Controller) |
| DT12S | PIP PERIOD, (Clock Ticks) |
| DT23S | LAST DT12S TIME |
| DT34S | 2nd LAST PIP PERIOD, (Clock Ticks) |
| ENGCYL | NUMBER OF PIP'S PER ENGINE REVOLUTION 2 = 4 CYL. ENGINE (2 PIP/REV) 3 = 6 CYL. ENGINE (3 PIP/REV) |
| SAFTOT | TOTAL SPARK ADVANCE, (Degrees of Crankshaft Rotation referenced from Cylinder Top Dead Center) |
| SYNCTR | SYNCHRONOUS COUNTER FOR SIGNATURE PIP |
| V_DEFSPK_CTR | NUMBER OF DEFAULT SPARK OCCURRENCES |
| V_DEL_T_MEA | Clock Ticks BETWEEN LAST HIGH PIP & IDM |
| V_IDM_CTR | NUMBER OF UNDETERMINED IDM FAULT EVENTS |
| V_LOOPS | NO. OF LOOPS TO BY-PASS ON BOARD IGNITION SYSTEM DIAGNOSTIC TEST AFTER VALID TEST CONDITIONS ARE ESTABLISHED |
| V_PAC_A_CTR | No. of COIL PACK 'A' FAULT Occurrences |
| V_PAC_B_CTR | No. of COIL PACK 'B' FAULT Occurrences |
| V_PAC_C_CTR | No. of COIL PACK 'C' FAULT Occurrences |
| V_PAC_A-B_CTR | No. of Combined COIL PACK 'A & B' FAULTS |
| V_PAC_A-C_CTR | No. of Combined COIL PACK 'A & C' FAULTS |
| V_PAC_BC_CTR | No. of Combined COIL PACK 'B & C' FAULTS |
| V_PIPDN_BYPS | NUMBER OF TIMES REMAINING TO BY-PASS OF ON BOARD IGNITION SYSTEM DIAGNOSTIC TEST |
| V_SAFTOT_CT1 | LAST CALCULATED SPARK ADV. (Clock Ticks) |
| V_SAFTOT_CT2 | 2nd LAST CALC. SPARK ADV. (Clock Ticks) |
| V_SAFTOT_CT3 | 3rd LAST CALC. SPARK ADV. (Clock Ticks) |
| V_SAFTOT_SAV | NEXT CALCULATED SPARK ADV. (Clock Ticks) |
| PIP_HIGH | PIP INPUT LEVEL (profile ignition pulse from crankshaft sensor) |
| UNDSP | UNDERSPEED FLAG INDICATING LOW ENGINE SPEED |
| UNDSP_TRANS | INDICATES UNDERSPEED MODE TRANSITION IN PROGRESS |
| VPIPFLG | WHEN FLAG 1= ERROR FOUND IN COMPUTER FOREGROUND PIP TEST |
| V_DIS_PIPDOT | PIP PERIOD MAXIMUM RATE OF CHANGE TO RECOGNIZE AN IDM FAULT |
| V_ERROR1 | EXPECTED SPARK ADVANCE NO FAULT TOLERANCE, UNITS ARE DEGREES |
| V_ERROR2 | SPARK ADVANCE FAULT TOLERANCE FOR TWO PIP PERIODS |
| V_ERROR3 | DEFAULT SPARK FAULT TOLERANCE, UNITS ARE DEGREES |
| V_ERROR4 | SPARK ADVANCE FAULT TOLERANCE FOR ONE PIP PERIOD |
| V_SYNCFLG | 1 = ENGINE IN SYNCHRONIZATION WITH COMPUTER |
| VSAFSPK | QUALIFIER FOR VALID SPARK ADVANCE CALCULATED AT PIP HIGH CONDITION |

We claim:

1. A method of testing an internal combustion engine with a distributorless ignition system having an ignition coil, for an ignition fault including the steps of:

detecting the time period between the actual occurrence of a spark plug firing and the occurrence of a reference signal;

2. A method as recited in claim 1 wherein the step of calculating the time period includes:

detecting the time of occurrence of the engine rotational reference signal (PIP);

reading a previously stored time of occurrence of the most recent spark event;

comparing detected and calculated durations between spark events with respect to the PIP; and incrementing counters in response to spark failure and storing the time of spark events.

3. A method as recited in claim 2 further comprising the step of testing a sensor indicating engine rotational position for proper operation to confirm the occurrence of the engine rotational reference signal (PIP) so that the comparison between detected and calculated durations between spark events can be made with respect to PIP.

4. A method as recited in claim 3 wherein the step of detecting the time period includes:

detecting actual spark plug firing using the collapsing field adjacent the ignition coil; and generating an output signal indicating spark event current flow.

5. A method of testing an internal combustion engine with a distributorless ignition system having an ignition coil for an ignition fault including the steps of:

detecting the time of occurrence of spark plug firing by detecting the collapsing field adjacent the ignition coil;

generating an output signal indicating the flow of spark event current;

calculating the time of spark plug firing by detecting the rotational position of the internal combustion engine;

reading a previously stored time of occurrence of a spark;

comparing detected and calculated durations between the time the stored spark and the times of detected and calculated spark utilizing averaged rotational velocities and time rate adjusted tolerance bands, setting counters and storing time;

comparing the calculated time and the detected time of spark plug firing to see if they come within a predetermined time period and indicating a fault if the time of occurrence of the calculated and the detected spark do not come within the predetermined time period; and testing a sensor indicating engine rotational position for operation to confirm the occurrence of the engine rotational reference signal (PIP) so that the comparison between detected and calculated durations between spark events can be made with respect to PIP.

6. A test apparatus for testing an internal combustion engine with a distributorless ignition system having an ignition coil for an ignition fault including:

detecting means coupled to a spark plug of the internal combustion engine for detecting the time of occurrence of a spark plug firing;

calculation means coupled to the internal combustion engine for calculating the time of spark firing;

comparison means coupled to said detecting means and said calculation means for comparing the calculated time and the detected time of spark plug firing to see if the calculated and detected times come within a predetermined time period;

predetermined time period means coupled to said comparison means for adjusting the predetermined time period as a function of engine rotational velocity throughout the engine operating range; and indication means coupled to said comparison means for indicating a fault if the time of occurrence of the calculated spark and the time of occurrence of the detected spark do not come within the predetermined time period.

7. A test apparatus for testing an internal combustion engine with a distributorless ignition system as recited in claim 6 wherein said calculation means includes:

sensing means for sensing the rotational position of the internal combustion engine;

reading means for reading a previously stored time of occurrence of a spark; and setting means for setting storage counters and storing time as a function of engine operating conditions.

8. A test apparatus for testing an internal combustion engine with a distributorless ignition system as recited in claim 7 further comprising a sensor coupled to said internal combustion engine for indicating engine rotational position and test means coupled to said sensor for determining operation of said sensor to confirm the occurrence of an engine rotational reference signal (PIP) so that the comparison between detected and calculated durations between spark events can be made with respect to PIP.

9. A test apparatus for testing an internal combustion engine with a distributorless ignition system as recited in claim 8 wherein said detecting means includes:

field means coupled to the ignition coil for detecting a collapsing magnetic field adjacent the ignition coil; and generation means coupled to said field means for generating an output signal as a function of flow of spark event current.

10. A test apparatus for testing an internal combustion engine with a distributorless ignition system having an ignition coil for an ignition fault including:

detecting means, coupled to a spark plug of the internal combustion engine for detecting the time of occurrence of a spark plug firing and including field means for detecting the collapsing magnetic field adjacent the ignition coil and generation means for generating an output signal indicating the flow of spark event current;

calculation means coupled to the internal combustion engine for calculating the time of spark firing and including sensing means for sensing the rotational position of the internal combustion engine, reading means for reading a previously stored time of occurrence of a spark, and setting means for setting storage counters to store time;

comparison means coupled to said detecting means and said calculation means for comparing the calculated time and the detected time of spark plug firing to see if the calculated and the detected time come within a predetermined time period;

predetermined time period means coupled to said comparison means for adjusting the predetermined time period as a function of engine rotational velocity throughout the engine operating range;

indication means coupled to said comparison means for indicating a fault if the time occurrence of the calculated spark and the time occurrence of the detected spark do not come within the detected time period;

a position sensor for indicating engine rotational position; and test means for testing operation of said position sensor to confirm the occurrence of an engine rotational reference signal (PIP) so that the comparison between detected and calculated durations between spark events can be made with respect to PIP.

* * * * *